United States Patent
Leslie-Hurd et al.

(10) Patent No.: US 9,355,262 B2
(45) Date of Patent: May 31, 2016

(54) MODIFYING MEMORY PERMISSIONS IN A SECURE PROCESSING ENVIRONMENT

(71) Applicant: Intel Corporation, Santa Clara, CA (US)

(72) Inventors: Rebekah Leslie-Hurd, Portland, OR (US); Ilya Alexandrovich, Haifa (IL); Ittai Anati, Haifa (IL); Alex Berenzon, Zikhron Ya'akov (IL); Michael Goldsmith, Lake Oswego, OR (US); Simon Johnson, Beaverton, OR (US); Francis McKeen, Portland, OR (US); Carlos Rozas, Portland, OR (US); Uday Savagaonkar, Portland, OR (US); Vincent Scarlata, Beaverton, OR (US); Vedvyas Shanbhogue, Austin, TX (US); Wesley Smith, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/141,941

(22) Filed: Dec. 27, 2013

(65) Prior Publication Data

US 2015/0186659 A1    Jul. 2, 2015

(51) Int. Cl.
| | | |
|---|---|---|
| *G06F 21/60* | (2013.01) | |
| *G06F 12/08* | (2016.01) | |
| *G06F 12/14* | (2006.01) | |
| *G06F 9/30* | (2006.01) | |
| *G06F 21/72* | (2013.01) | |

(52) U.S. Cl.
CPC ............ *G06F 21/604* (2013.01); *G06F 9/3004* (2013.01); *G06F 12/0875* (2013.01); *G06F 12/145* (2013.01); *G06F 12/1466* (2013.01); *G06F 21/72* (2013.01)

(58) Field of Classification Search
CPC ............ G06F 12/0808; G06F 12/1027; G06F 12/1466; G06F 12/0875; G06F 12/145; G06F 9/3004; G06F 21/72; G06F 21/604
See application file for complete search history.

(56) References Cited

U.S. PATENT DOCUMENTS

| | | | |
|---|---|---|---|
| 2008/0016315 A1 * | 1/2008 | Cohen et al. | 711/207 |
| 2009/0150645 A1 | 6/2009 | Ono et al. | |
| 2011/0231593 A1 * | 9/2011 | Yasufuku et al. | 711/3 |
| 2012/0110348 A1 * | 5/2012 | Hofstee et al. | 713/190 |
| 2012/0117301 A1 * | 5/2012 | Wingard | 711/6 |
| 2012/0159184 A1 | 6/2012 | Johnson et al. | |

FOREIGN PATENT DOCUMENTS

| | | |
|---|---|---|
| WO | 2010057065 A2 | 5/2010 |
| WO | 2012087562 A2 | 6/2012 |

OTHER PUBLICATIONS

Extended European Search Report received for European Patent Application No. 14193950.4 mailed on Jul. 10, 2015, 8 pages of Search Report.

* cited by examiner

*Primary Examiner* — Chau Le
*Assistant Examiner* — Muhammad Chaudhry
(74) *Attorney, Agent, or Firm* — Thomas R. Lane

(57) ABSTRACT

Embodiments of an invention for modifying memory permissions in a secure processing environment are disclosed. In one embodiment, a processor includes an instruction unit and an execution unit. The instruction unit is to receive an instruction to modify access permissions for a page in a secure enclave. The execution unit is to execute the instruction. Execution of the instruction includes setting new access permissions in an enclave page cache map entry. Furthermore, the page is immediately accessible from inside the secure enclave according to the new access permissions.

10 Claims, 6 Drawing Sheets

METHOD 600

FIGURE 5
METHOD 500

FIGURE 6
METHOD 600

MODIFYING MEMORY PERMISSIONS IN A SECURE PROCESSING ENVIRONMENT

BACKGROUND

1. Field

The present disclosure pertains to the field of information processing, and more particularly, to the field of security in information processing systems.

2. Description of Related Art

Confidential information is stored, transmitted, and used by many information processing systems. Therefore, techniques have been developed to provide for the secure handling and storing of confidential information. These techniques include various approaches to creating and maintaining a secured, protected, or isolated container, partition, or environment within an information processing system.

BRIEF DESCRIPTION OF THE FIGURES

The present invention is illustrated by way of example and not limitation in the accompanying figures.

DETAILED DESCRIPTION

Embodiments of an invention for modifying memory permissions in a secure processing environment are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in the claims, unless otherwise specified the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type of storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

As described in the background section, various approaches to creating and maintaining a secured, protected, or isolated container, partition, or environment within an information processing system have been developed. One such approach involves secure enclaves as described in the co-pending U.S. patent applications entitled "Method and Apparatus to Provide Secure Application Execution," filed Jun. 19, 2012, Ser. No. 13/527,547, which provides information regarding at least one embodiment of a secured, protected, or isolated container, partition, or environment. However, this reference is not intended to limit the scope of embodiments of the invention in any way and other embodiments may be used while remaining within the spirit and scope of the present invention. Therefore, any instance of any secured, protected, or isolated container, partition, or environment used in any embodiment of the present invention may be referred to herein as a secure enclave or an enclave.

Embodiments of the present invention provide for dynamically modifying permissions to access enclave memory without making that memory inaccessible, to an application running in the enclave, during the modification process. Enclave usage models may include software running inside an enclave using permission restrictions to optimize the performance of read-mostly concurrent data structures, with the expectation that readers may access the data structure throughout the permission modification process. Embodiments of the present invention may provide for this expectation to be met, under some conditions, without requiring the performance-lowering overhead of exiting from the enclave to modify the permissions. For example, a critical code section may copy a heap page to a new location during garbage collection, when writers to the page must be paused, but embodiments of the present invention provide for readers to safely continue access.

Figure 1:
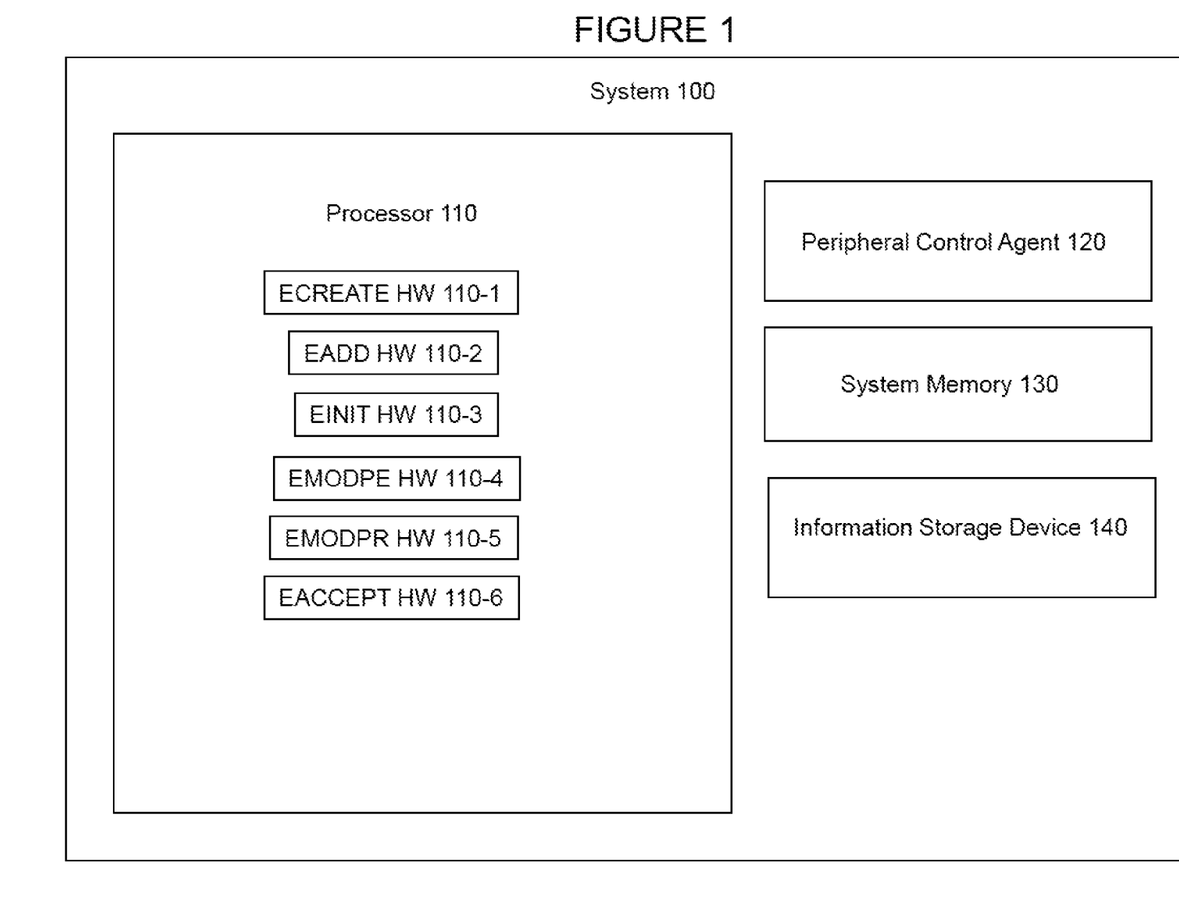
FIG. 1 illustrates a system providing for modifying memory permissions in a secure processing environment according to an embodiment of the present invention.

FIG. 1 illustrates system 100, an information processing system providing for modifying memory permissions in a secure processing environment according to an embodiment of the present invention. System 100 may represent any type of information processing system, such as a server, a desktop computer, a portable computer, a set-top box, a hand-held device such as a tablet or a smart phone, or an embedded control system. System 100 includes processor 110, peripheral control agent 120, system memory 130, and information storage device 140. Systems embodying the present invention may include any number of each of these components and any other components or other elements, such as peripherals and input/output devices. Any or all of the components or other elements in this or any system embodiment, may be connected, coupled, or otherwise in communication with each other through any number of buses, point-to-point, or other wired or wireless interfaces or connections, unless specified otherwise. Any components or other portions of system 100, whether shown in FIG. 1 or not shown in FIG. 1, may be integrated or otherwise included on or in a single chip (a system-on-a-chip or SOC), die, substrate, or package.

Peripheral control agent 120 may represent any component, such as a chipset component, including or through which peripheral, input/output, or other components or devices may be connected or coupled to processor 110. System memory 130 may be dynamic random access memory or any other type of medium readable by processor 110. Information storage device 140 may include any type of persistent or non-volatile memory or storage, such as a flash memory and/or a solid state, magnetic, or optical disk drive.

Processor 110 may represent one or more processors integrated on a single substrate or packaged within a single package, each of which may include multiple threads and/or multiple execution cores, in any combination. Each processor represented as or in processor 110 may be any type of processor, including a general purpose microprocessor, such as a processor in the Intel® Core® Processor Family, Intel® Atom® Processor Family, or other processor family from Intel® Corporation, or another processor from another company, or a special purpose processor or microcontroller.

Processor 110 may operate according to an instruction set architecture that includes a first instruction to create a secure enclave, a second instruction to add content to an enclave, a third instruction to initialize an enclave, a fourth instruction to extend memory permissions, a fifth instruction to restrict memory permissions, and a sixth instruction to verify a permissions restriction. Although embodiments of the present invention may be practiced with a processor having any instruction set architecture and are not limited to the architecture of a processor family from Intel® Corporation, the instructions may be part of a set of software protection extensions to an existing architecture, and may be referred to herein as an ECREATE instruction, an EADD instruction, an EINIT instruction, an EMODPE instruction, an EMODPR instruction, and an EACCEPT instruction, respectively. Support for these instructions may be implemented in a processor using any combination of circuitry and/or logic embedded in hardware, microcode, firmware, and/or other structures arranged as described below or according to any other approach, and is represented in FIG. 1 as ECREATE hardware 110-1, EADD hardware 110-2, EINIT hardware 110-3, EMODPE hardware 110-4, EMODPR hardware 110-5, and EACCEPT hardware 110-6.

Figure 2:
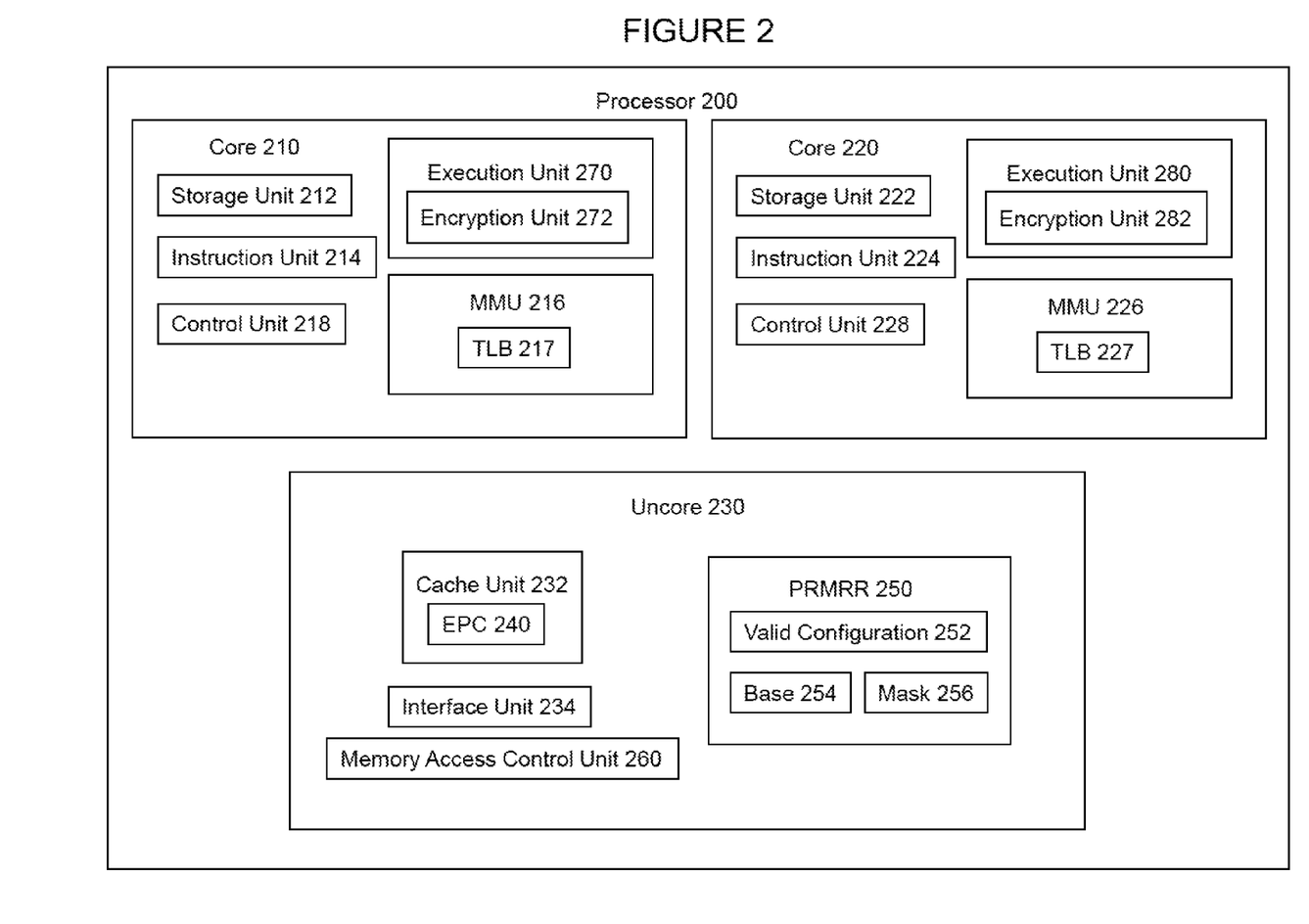
FIG. 2 illustrates a processor providing for modifying memory permissions in a secure processing environment according to an embodiment of the present invention.

FIG. 2 illustrates processor 200, an embodiment of which may serve as processor 110 in system 100. Processor 200 may include core 210, core 220, and uncore 230. Core 210 may include storage unit 212, instruction unit 214, execution unit 270, memory management unit (MMU) 216, and control unit 218. Core 220 may include storage unit 222, instruction unit 224, execution unit 280, MMU 226, and control unit 228. Uncore 230 may include cache unit 232, interface unit 234, processor reserved memory range registers 250, and memory access control unit 260. Processor 200 may also include any other circuitry, structures, or logic not shown in FIG. 2. The functionality of ECREATE hardware 110-1, EADD hardware 110-2, EINIT hardware 110-3, EMODPE hardware 110-4, EMODPR hardware 110-5, and EACCEPT hardware 110-6, as introduced above and further described below, may be contained in or distributed among any of the labeled units or elsewhere in processor 200.

Storage units 212 and 222 may include any combination of any type of storage usable for any purpose within cores 210 and 220, respectively; for example, they may include any number of readable, writable, and/or read-writable registers, buffers, and/or caches, implemented using any memory or storage technology, for storing capability information, configuration information, control information, status information, performance information, instructions, data, and any other information usable in the operation of cores 210 and 220, respectively, as well as circuitry usable to access such storage.

Instruction units 214 and 224 may include any circuitry, logic, structures, and/or other hardware for fetching, receiving, decoding, interpreting, and/or scheduling instructions, such as EMODPE, EMODPR, and EACCEPT instructions, to be executed by cores 210 and 220, respectively. Any instruction format may be used within the scope of the present invention; for example, an instruction may include an opcode and one or more operands, where the opcode may be decoded into one or more micro-instructions or micro-operations for execution by execution unit 270 or 280, respectively. Instructions, such as those referred to above, may be leaves of a single opcode, such as a privileged secure enclave opcode (e.g., ENCLS) or an unprivileged secure enclave opcode (e.g., ENCLU), where the leaf instructions are specified by the value in a processor register (e.g., EAX). Operands or other parameters may be associated with an instruction implicitly, directly, indirectly, or according to any other approach.

Execution units 270 and 280 may include any circuitry, logic, structures, and/or other hardware, such as arithmetic units, logic units, floating point units, shifters, etc., for processing data and executing instructions, such as EMODPE, EMODPR, and EACCEPT instructions, micro-instructions, and/or micro-operations. Execution units 270 and 280 may include encryption units 272 and 282, respectively, which may represent any circuitry, logic, structures, and/or other hardware to execute any one or more encryption algorithms and the corresponding decryption algorithms using circuitry, logic, structures, and/or other hardware dedicated to encryption/decryption or shared within execution units 270 and 280 or elsewhere in processor 200 to perform other functions.

MMUs 216 and 226 may include any circuitry, logic, structures, and/or other hardware to manage the memory space of cores 210 and 220, respectively. Memory management logic supports the use of virtual memory to provide software, including guest software running in a VM, with an address space for storing and accessing code and data that is larger than the address space of the physical memory in the system, e.g., system memory 130. The virtual memory space of cores 210 and 220 may be limited only by the number of address bits available to software running on the processor, while the physical memory space of cores 210 and 220 is further limited to the size of system memory 130. MMUs 216 and 226 support a memory management scheme, such as paging, to swap the executing software's code and data in and out of system memory 130 on an as-needed basis. As part of this scheme, the software may access the virtual memory space of the processor with an un-translated address that is translated by the processor to a translated address that the processor may use to access the physical memory space of the processor.

Accordingly, MMU 216 and 226 may include translation lookaside buffers (each, a TLB) 217 and 227, respectively, to stores translations of a virtual, logical, linear, or other un-translated address to a physical or other translated address, according to any known memory management technique, such as paging. To perform these address translations, MMU 216 and 226 may refer to one or more data structures stored in processor 200, system memory 130, any other storage location in system 100 not shown in FIG. 1, and/or any combination of these locations. The data structures may include page directories and page tables according to the architecture of the Pentium® Processor Family.

Control units 218 and 228 may include any microcode, firmware, circuitry, logic, structures, and/or other hardware to control the operation of the units and other elements of cores 210 and 220, respectively, and the transfer of data within, into, and out of cores 210 and 220. Control units 218 and 228 may cause cores 210 and 220 and processor 200 to perform or participate in the performance of method embodiments of the present invention, such as the method embodiments described below, for example, by causing cores 210 and 220 to execute instructions, such as EMODPE, EMODPR, and EACCEPT instructions, received by instruction units 214 and 224 and micro-instructions or micro-operations derived from instructions received by instruction units 214 and 224.

Cache unit 232 may include any number of cache arrays and cache controllers in one or more levels of cache memory in a memory hierarchy of information processing system 100, implemented in static random access memory or any other memory technology. Cache unit 232 may be shared among any number of cores and/or logical processors within processor 200 according to any approach to caching in information processing systems. Cache unit 232 may also include one or more memory arrays to be used as enclave page cache (EPC) 240 as further described below.

Interface unit 234 may represent any circuitry, logic, structures, and/or other hardware, such as a link unit, a bus unit, or a messaging unit to allow processor 200 to communicate with other components in a system such as system 100 through any type of bus, point to point, or other connection, directly or through any other component, such as a bridge, hub, or chipset. Interface unit 234 may include one or more integrated memory controllers to communicate with a system memory such as system memory 130 or may communicate with a system memory through one or more memory controllers external to processor 200.

Processor reserved memory range registers (PRMRR) 250 may represent any one or more storage locations in storage units 212 and 222, elsewhere in processor 200, and/or copies thereof in uncore 230. PRMRR 250 may be used, for example by configuration firmware such as a basic input/output system, to reserve one or more physically contiguous ranges of memory called processor reserved memory (PRM). Memory access control unit 260 may represent any circuitry, structures, logic, and/or other hardware anywhere in processor 200 that may control access to PRM such that EPC 240 may be created within the system memory space defined as PRM.

In an embodiment, PRM is of a size that is an integer power of two, e.g. 32 MB, 64 MB, or 128 MB, and is aligned to a memory address that is a multiple of that size. PRMRR 250 may include one or more instances of a read-only PRMMR valid configuration register 252 to indicate the valid sizes to which PRM may be configured, one or more instances of a PRMMR base register 254 and a PRMMR mask register 256 to define one or more base addresses and ranges of PRM.

EPC 240 is a secure storage area in which software may be protected from attacks by malware operating at any privilege level. One or more secure enclaves may be created such that each enclave may include one or more pages or other regions of EPC 240 in which to store code, data, or other information in a way that it may only be accessed by software running inside that enclave, except according to embodiments of the present invention. For example, a secure enclave may be used by a software application so that only that software application, while running inside that enclave, may access the contents of that enclave, except according to embodiments of the present invention. Except according to embodiments of the present invention, no other software, not even an operating system or a virtual machine monitor, may read the unencrypted contents of that enclave, modify the contents of that enclave, or otherwise tamper with the contents of that enclave while the content is loaded into the EPC (assuming that the enclave is a production enclave, as opposed to, for example, a debug enclave). However, the contents of the enclave may be accessed by software executing from within that enclave on any processor in system 100. This protection is accomplished by the memory access control unit 260 operating according to the secure enclaves architecture.

In FIG. 2, EPC 240 is shown in cache unit 232, where it may be a sequestered portion of a shared cache or a dedicated memory. Within or on the same die as processor 200, EPC 240 may be implemented in static random access memory, embedded dynamic random access memory, or any other memory technology. EPC 240 may also or additionally be implemented external to processor 200, for example within a secure region of system memory 130. To protect the content of secure enclaves when it is not stored on-die, encryption units 272 and/or 282 may be used to encrypt the content before it is transferred off-die and to decrypt the content transferred back into EPC 240 on-die. Other protection mechanisms may also be applied to protect the content from replay and other attacks.

Figure 3:
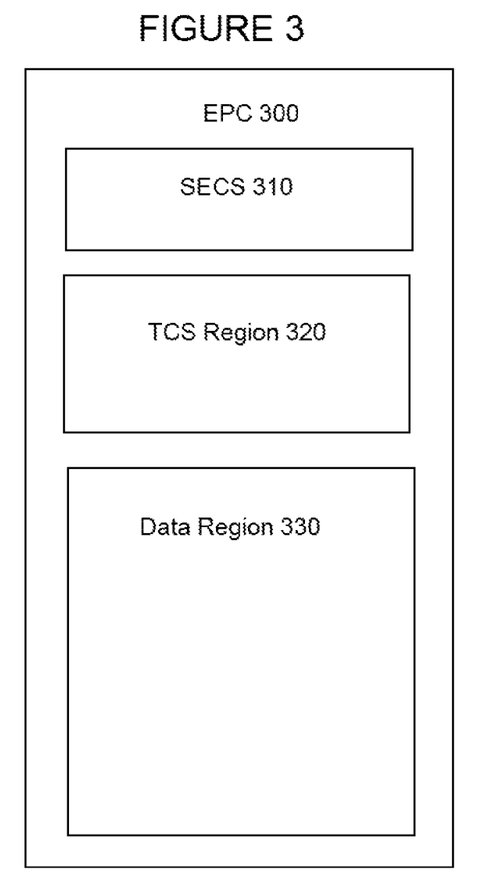
FIG. 3 illustrates an enclave page cache according to an embodiment of the present invention.

FIG. 3 illustrates EPC 300, an embodiment of which may serve as EPC 240 in FIG. 2. In FIG. 3, EPC 300 includes secure enclave control structure (SECS) 310, thread control structure (TCS) region 320, and data region 330. Although FIG. 3 shows EPC 300 divided into three separate regions. EPC 300 may be divided into any number of chunks, regions, or pages, each of which may be used for any type of content. In one embodiment, EPC 300 is divided into 4 kilobyte (KB) pages and is aligned to an address in system memory 130 that is a multiple of 4 KB, SECS 310 may be any one of the 4 KB pages in EPC 300, TCS region 320 may be any number of contiguous or non-contiguous 4 KB pages, and data region 330 may be any number of contiguous or non-contiguous 4 KB pages. Furthermore, although FIG. 3 shows one SECS, one TCS region, and one data region corresponding to one secure enclave, an EPC may include any number of SECS and any number of TCS and data regions, so long as each enclave has one and only one SECS, each valid TCS and valid data region (e.g., page) belongs to one and only one enclave, and all of the SECS, TCS, and data pages fit within the EPC (or may be paged out of and back into the EPC).

An SECS may created by the execution of an ECREATE instruction to contain metadata to be used by hardware, and accessible only by hardware (i.e., not readable, writable, or otherwise accessible by software, whether running inside or outside the enclave), to define, maintain, and protect the enclave. One or more TCSs may also be associated with a secure enclave. A TCS contains metadata used by the hardware to save and restore thread specific information when entering and exiting the enclave.

The security attributes of each page are stored in a microarchitectural data structure called an enclave page cache map (EPCM) that is used by memory access control unit 260 to enforce the protections provided by the secure enclaves architecture. The EPCM stores one entry for each page in the EPC. Each entry includes an identifier (e.g., a 64 bit field) of the SECS (i.e., the enclave) to which the page belongs. These identifiers may be referred to by secure enclaves instructions (e.g., the address of the SECS may be stored in a register such as RCX, the address of a micro-architectural data structure including the address of the SECS may be stored in a register such as RBX, etc.) to provide for the SECS to be read by hardware in order to execute the instruction.

Each entry in an EPCM may also include a number of bits or fields to define the access permissions and/or other attributes of the corresponding page. A read bit (R-bit) may be set to indicate that the page is readable from within the enclave. A write bit (W-bit) may be set to indicate that the page is writable from within the enclave. An execute bit (X-bit) may be set to indicate that the page is executable from within the enclave. A modified bit (M-bit) may be set to indicate that an access permission or other attribute of the page has been modified. A blocked-epoch field (BEPOCH) may be set to indicate the enclave epoch to be flushed for the page to be evicted from the EPC.

Figure 4:
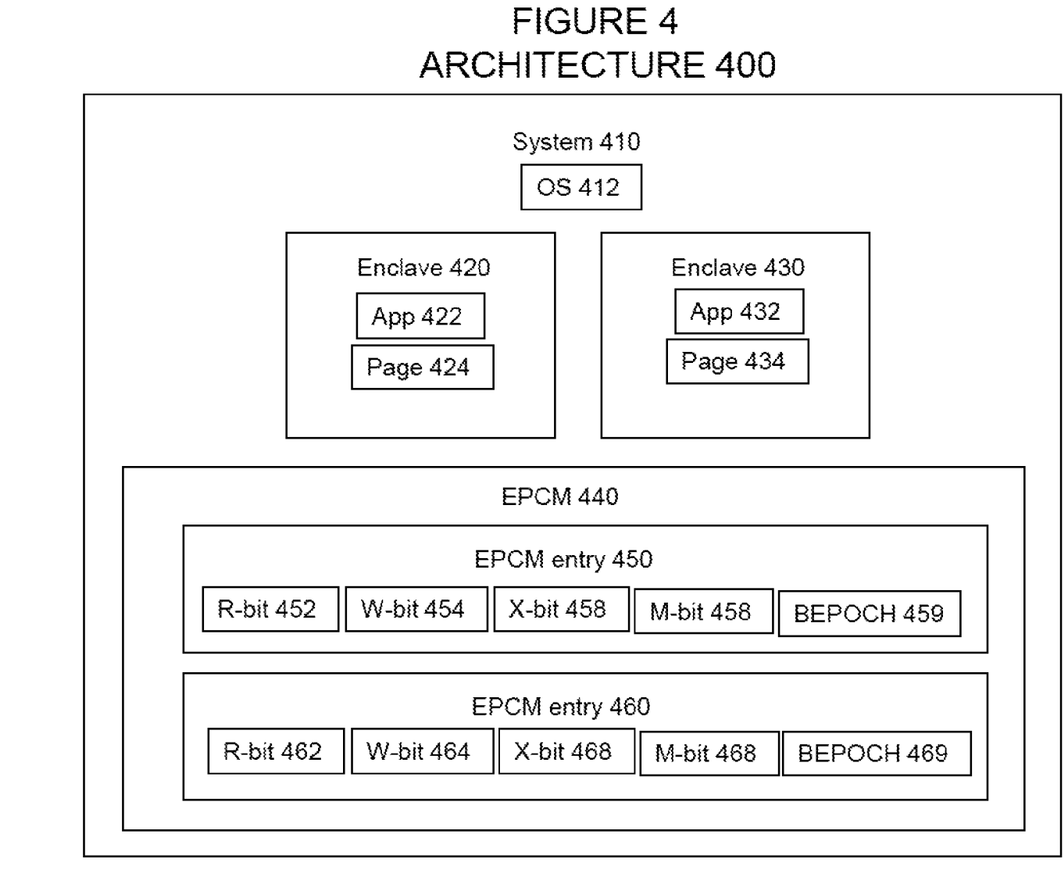
FIG. 4 illustrates a system architecture including secure processing environments according to an embodiment of the present invention.

FIG. 4 illustrates architecture 400, a system architecture including secure processing environments according to an embodiment of the present invention. In one embodiment, system 410 includes enclave 420 and enclave 430, each of which be created by the invocation and execution of an ECREATE instruction. Applications 422 and 432 may each represent application software, or any thread, task, process, or other instance of instructions, code, or software loaded into enclaves 420 and 430, respectively, each of applications 422 and 432 may be loaded into the enclave by the invocation and execution of one or more EADD instructions. Enclaves 420 and 430 may be initialized by the invocation and execution of an EINIT instruction. Applications 422 and 432 have entered the enclaves, for example by invoking an EENTER instruction. Therefore, applications 422 and 432 may be described as in, within, or executing or running in or within enclaves 420 and 430, respectively. Although FIG. 4 shows one application per enclave, in other embodiments, a single application may run within more than one enclave, and/or more than one application may run within a single enclave.

System 410 also includes one or more operating systems (each, an OS), virtual machine monitors (each, a VMM), or other system control or privileged software, each of which may operate on any one or more processors in system 410, within or outside of an enclave. For convenience, any such privileged software, whether or not an OS, is referred to in this description as OS 412. OS 412 (or any thread, task, process, or other instance of OS 412) may run at a processor privilege level (e.g. ring-0 or supervisor mode) that is more privileged than the processor privilege level (e.g., ring-3 or user mode) at which applications 422 and 432 run.

FIG. 4 also shows EPCM 440, for storing the security attributes of the EPC pages of enclaves 420 and 420, and two representative entries 450 and 460 of EPCM 440. Entry 450 includes read bit 452, write bit 454, and execute bit 456 to define the read, write, and execute access permissions of representative EPC page 424 of enclave 420. Entry 450 also includes modified bit 458 to indicate the status of a modification to the permissions of EPC page 424 and BEPOCH field 459 to indicate the enclave epoch to be flushed for page 424 to be evicted from EPC 300. Entry 460 includes read bit 462, write bit 464, and execute bit 466 to define the read, write, and execute access permissions of representative EPC page 434 of enclave 430. Entry 460 also includes modified bit 468 to indicate the status of a modification to the permissions of EPC page 434 and BEPOCH field 469 to indicate the enclave epoch to be flushed for page 434 to be evicted from EPC 300.

Embodiments of the present invention provide for a memory permissions extension instruction (e.g. an EMODPE instruction) to be used by an application in an enclave, such as application 422 or 432, to extend the access permissions of (i.e., make more easily accessible and/or make accessible under an increased number of conditions) memory (e.g., pages) in or allocated to its enclave, such that the extended permissions immediately become available to the application running within the enclave. In an embodiment, the memory permissions extension instruction may be a leaf of an unprivileged secure enclave instruction (e.g., ENCLU), such that it may be invoked by an application running in an enclave at a processor privilege level (e.g., ring-3) that is less privileged than a processor privilege level (e.g., ring-0) at which an OS runs outside of the enclave. The operation of a processor in response to a memory permissions extension instruction according to an embodiment of the present invention is further described below in the description of method 500 of FIG. 5.

Embodiments of the present invention also provide for an application in an enclave, such as application 422 or 432, to restrict the access permissions of (i.e., make less easily accessible and/or make accessible under a decreased number of conditions) memory (e.g., pages) in or allocated to its enclave by invoking a system call to a system software, such as OS 412, to perform a memory permissions restriction instruction (e.g., EMODPR) instruction. In an embodiment, the memory permissions restriction instruction may be a leaf of a privileged secure enclave instruction (e.g., ENCLS), such that it may be invoked by an OS, VMM, or other system software running outside of an enclave at a processor privilege level (e.g., ring-0) that is more privileged than a processor privilege level (e.g., ring-3) at which an application runs inside of the enclave, but it cannot be invoked directly by the application. The restricted permissions become effectively immediately upon the execution of the EMODPR instruction, with no further action required from the application that invoked the system call; however, the application may verify that the restricted permission have become effective by invoking an EACCEPT instruction, which may be a leaf of the ENCLU instruction. The operation of a processor in response to a memory permissions restriction instruction according to an embodiment of the present invention is further described below in the description of method 600 of FIG. 6.

Figure 5:
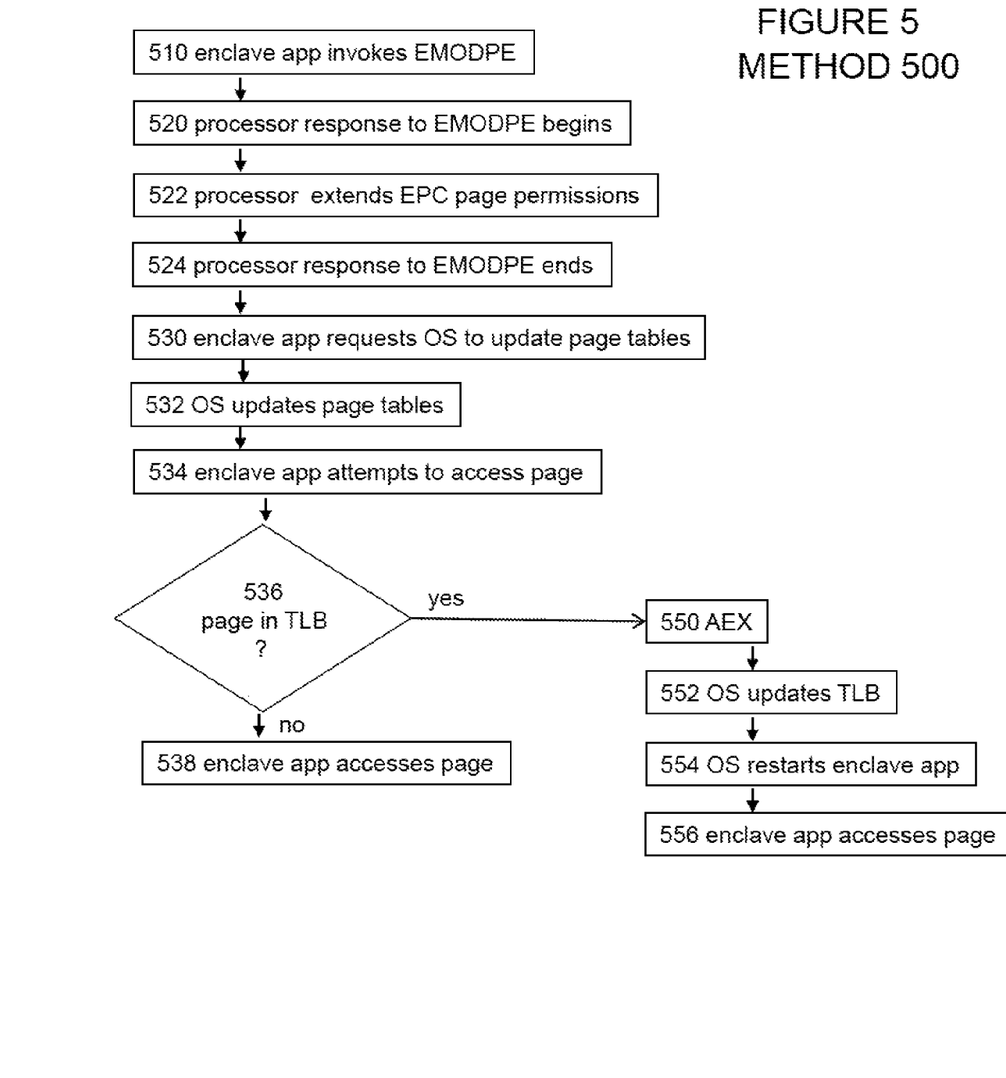
FIG. 5 illustrates a method for extending memory permissions in a secure processing environment according to an embodiment of the present invention.
Figure 6:
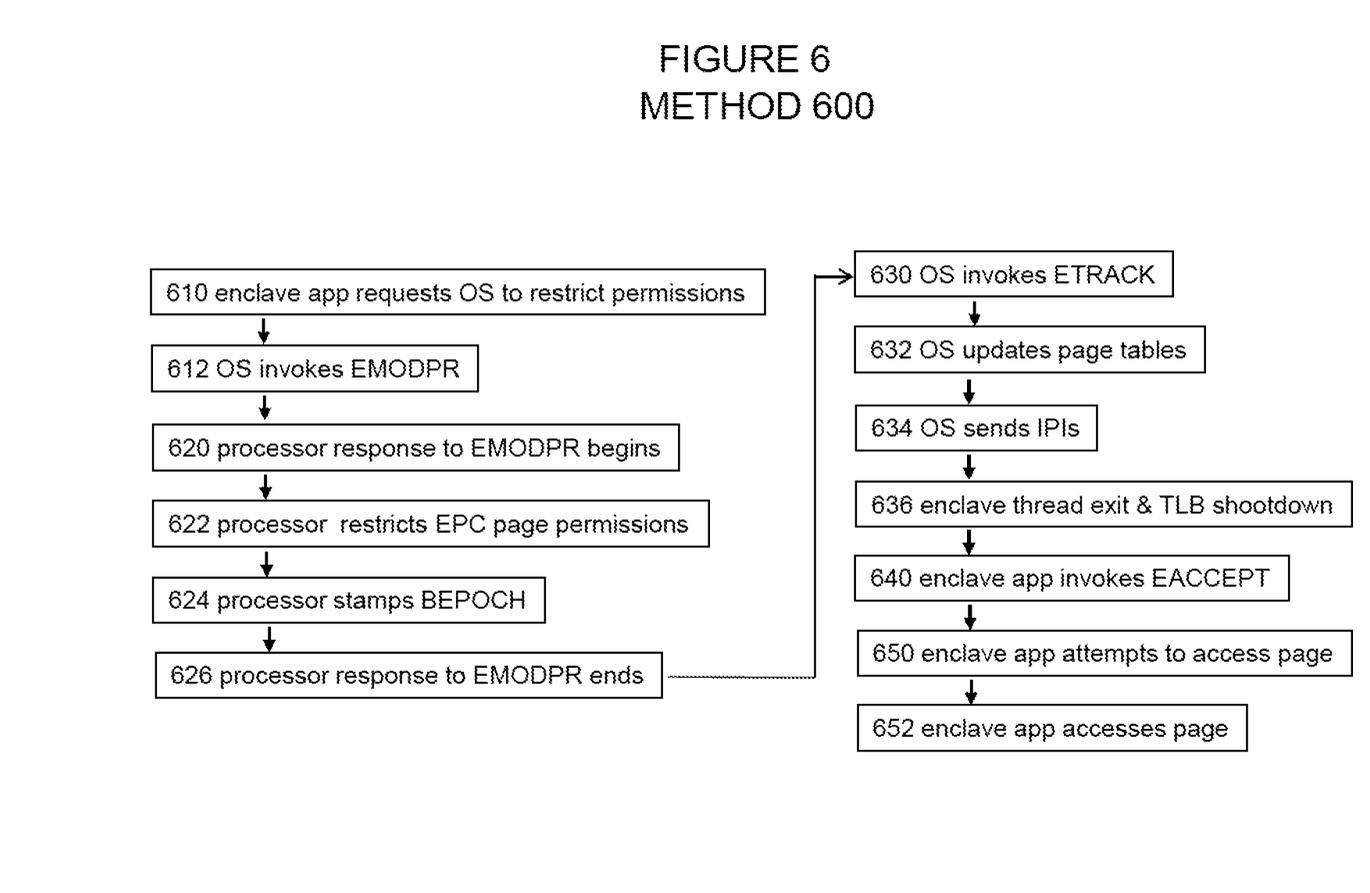
FIG. 6 illustrates a method for restricting memory permissions in a secure processing environment according to an embodiment of the present invention.

FIGS. 5 and 6 illustrate methods 500 and 600, methods for extending and restricting, respectively, memory permissions in a secure processing environment according to an embodiment of the present invention. Although method embodiments of the invention are not limited in this respect, reference may be made to elements of FIGS. 1, 2, 3, and 4 to help describe the method embodiments of FIGS. 5 and 6. Also, methods 500 and 600 may be described and illustrated, for convenience, using specific instruction names such as EMODPE, EMODPR, and EACCEPT; however, embodiments of the present invention are not limited to these specifically named instructions.

In box 510 of method 500, an application, such as application 422, running in an enclave, such as enclave 420, at a user mode privilege level, invokes an EMODPE instruction to extend the permissions according to which a page, such as page 424, in EPC 240 may be accessed. The access permissions may include read access, write access, execute access, and/or any other permission indicator to indicate how the page may be accessed. For example, the application may invoke the EMODPE instruction in order to change a page designated as read-only to read-write. The EMODPE instruction may have associated with it a first operand to identify the page, for example, using a linear or other address, and a second operand to identify the new permissions. Alternatively, the identity of the page and/or the new permissions or change to the existing permissions may be indicated according to any other approach.

In box 520, a response to the EMODPE instruction by a processor, such as processor 200, begins. The response may be performed entirely by processor hardware, such as instruction unit 214 and execution unit 270, under the control of microcode or other control logic of a control unit such as control unit 218, without any other instruction being invoked by application 422 or other software. In one embodiment, a processor executes an EMODPE instruction only when invoked from user mode.

In box 522, in response to the EMODPE instruction, the processor changes the EPC access permissions of page 424 as specified by the EMODPE instruction. For example, the processor changes the contents (e.g., from zero to one) of one or more permission bits or other indicators in an EPCM entry corresponding to the page, such as R-bit 452, W-bit 454, and/or X-bit 456 of EPCM entry 450. Furthermore, the processor changes the page's access permissions such that the new permissions are immediately effective, e.g., without setting or changing M-bit 458. Therefore, the execution of the EMODPE instruction differs from the execution of an access permission modification instruction such as EMOD, in response to which the processor sets M-bit 458 such that the page cannot be accessed until application 422 or other software clears M-bit 458 by invoking an EACCEPT instruction. The execution of the EMODPE instruction also differs from the execution of access permission restriction instruction EMODPR because BEPOCH field 459 is not set in response to EMODPE as it would be in response to EMODPR, as described below.

In box 524, the processor's response to and/or execution of the EMODPE instruction ends, such that the processor has responded to and/or executed the EMODPE instruction without making the page inaccessible to application 422.

In box 530, application 422 in enclave 420 requests OS 412 (or other privileged software such as a VMM) to update the permissions of page 424 to match the new permissions applied in box 522, for example, by invoking a system call for OS 412 (or other privileged software such as a VMM) to change the permissions of page 424 in an entry in a page directory, page table, or other structure through which page 424 is accessed. Note that application 422 may continue to access page 424 according to the old (more restrictive) permissions before OS 412 (or other privileged software such as a VMM) has updated the permissions in the page tables. In box 532, OS 412 (or other privileged software such as a VMM), running outside of enclave 420 in supervisor mode, updates the permissions for page 424 in the page tables.

In box 534, application 422 in enclave 420 attempts to access page 424 according to the new permissions. In box 536, if the untranslated (e.g., linear) address with which application 422 attempts to access page 424 is stored in TLB 217, method 500 continues in box 550. In box 536, if the untranslated (e.g., linear) address with which application 422 attempts to access page 424 is not stored in TLB 217, method 500 continues in box 538. In box 538, application 422 in enclave 420 successfully accesses page 424 according to the new permissions, without causing an asynchronous exit from enclave 420.

In box 550, the attempt to access page 424 causes an asynchronous exit (AEX) from enclave 420. In box 552, OS 412 (or other privileged software such as a VMM), running outside of enclave 420 in supervisor mode, updates or flushes the corresponding entry in TLB 217. In box 554, OS 412 (or other privileged software such as a VMM) restarts application 422 in enclave 420. In box 556, application 422 in enclave 420 successfully accesses page 424 according to the new permissions.

Turning to method 600, in box 610 an application, such as application 432, running in an enclave, such as enclave 430, at a user mode privilege level, invokes a system call to an OS (or other privileged software such as a VMM), such as OS 412, to request the OS (or other privileged software such as a VMM) to restrict the permissions according to which a page, such as page 434, in EPC 240 may be accessed. The access permissions may include read access, write access, execute access, and/or any other permission indicator to indicate how the page may be accessed. For example, the application may invoke the system call in order to change a page designated as read-write to read-only.

In box 612, in response to the system call of box 610, OS 412 (or other privileged software such as a VMM), running outside enclave 430 at a supervisor mode privilege level, invokes an EMODPR instruction to restrict the permissions according to which page 434 in EPC 240 may be accessed. The EMODPR instruction may have associated with it a first operand to identify the page, for example, using a linear or other address, and a second operand to identify the new permissions. Alternatively, the identity of the page and/or the new permissions or change to the existing permissions may be indicated according to any other approach.

In box 620, a response to the EMODPR instruction by a processor, such as processor 200, begins. The response may be performed entirely by processor hardware, such as instruction unit 214 and execution unit 270, under the control of microcode or other control logic of a control unit such as control unit 218, without any other instruction being invoked by application 432 or other software. In one embodiment, a processor executes an EMODPR instruction only when invoked from supervisor mode.

In box 622, in response to the EMODPR instruction, the processor changes the EPC access permissions of page 434 as specified by the EMODPR instruction. For example, the processor changes the contents (e.g., from one to zero) of one or more permission bits or other indicators in an EPCM entry corresponding to the page, such as R-bit 462, W-bit 464, and/or X-bit 466 of EPCM entry 460. Furthermore, the processor changes the page's access permissions such that the new permissions are immediately effective, e.g., without setting or changing M-bit 468. Therefore, the execution of the EMODPR instruction differs from the execution of an access permission modification instruction such as EMOD, in response to which the processor sets M-bit 468 such that the page cannot be accessed until application 432 or other software clears M-bit 468 by invoking an EACCEPT instruction.

In box 624, in response to the EMODPR instruction, the processor sets BEPOCH field 469 to the identity of the current enclave epoch thereby providing, as further described below, for the tracking and flushing of TLB entries that are made stale by the permissions restriction. Therefore, application 432 may proceed safely with a critical code section after the TLB entries belonging to the current enclave epoch have been flushed.

In box 626, the processor's response to and/or execution of the EMODPR instruction ends, such that the processor has responded to and/or executed the EMODPR instruction without making the page inaccessible to application 432.

In box 630, OS 412 (or other privileged software such as a VMM) tracks enclave threads with TLB entries made stale by the permissions restriction, for example by invoking an ETRACK instruction.

In box 632, OS 412 (or other privileged software such as a VMM) updates the permissions of page 434 to match the new permissions applied in box 622, for example, by changing the permissions of page 434 in an entry in a page directory, page table, or other structure through which page 434 is accessed. Note that application 432 may continue to access page 434 according to the new (more restrictive) permissions applied in box 522 before OS 412 (or other privileged software such as a VMM) has updated the permissions in the page tables.

In box 634, OS 412 (or other privileged software such as a VMM) sends inter-processor-interrupts (IPIs) to trigger enclave thread exit (i.e., all threads using page 434 exit enclave 430) and a TLB shootdown. In box 636, all such threads exit enclave 430, for example by invoking an EEXIT instruction, and the TLB shootdown flushes TLB entries made stale by the permissions restriction.

In box 640, application 432 in enclave 430 verifies that the permission restriction has been performed, for example by invoking an EACCEPT instruction. Note, however, that the actions of box 640, including the use of an EACCEPT instruction, is not required for application 432 to access page 434 according to the new permissions. Also, the verification will succeed only if all relevant threads have exited the enclave, for example in box 636.

In box 650, application 432 in enclave 430 attempts to access page 434 according to the new permissions. In box 652, application 432 in enclave 430 successfully accesses page 434 according to the new permissions, without causing an asynchronous exit from enclave 430.

Note that in the time period between the updating of the EPCM to reflect the new permissions (e.g., box 522 of method 500 or box 622 of method 600) and the updating of the page tables to reflect the new permissions (e.g., box 532 of method 500 or box 632 of method 600), the page is available to an enclave thread, but access to the page (e.g., page 432 or page 434) is restricted by the more restrictive of the EPCM permissions and the page table permissions. Therefore, in method 500, which illustrates an instruction to extend the permissions, the page is accessed by an enclave thread during this time period according to the old permissions, and in method 600, which illustrates an instruction to restrict the permissions, the page is accessed by an enclave thread during the time period according to the new permissions.

In various embodiments of the present invention, the methods illustrated in FIGS. 5 and 6 may be performed in a different order, with illustrated boxes combined or omitted, with additional boxes added, or with a combination of reordered, combined, omitted, or additional boxes. Furthermore, method embodiments of the present invention are not limited to methods 500 and 600 or variations thereof. Many other method embodiments (as well as apparatus, system, and other embodiments) not described herein are possible within the scope of the present invention.

Embodiments or portions of embodiments of the present invention, as described above, may be stored on any form of a machine-readable medium. For example, all or part of methods 500 and 600 may be embodied in software or firmware instructions that are stored on a medium readable by processor 110, which when executed by processor 110, cause processor 110 to execute an embodiment of the present invention. Also, aspects of the present invention may be embodied in data stored on a machine-readable medium, where the data represents a design or other information usable to fabricate all or part of processor 110.

Thus, embodiments of an invention for modifying memory permissions in a secure processing environment have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
   instruction hardware to receive a first instruction and a second instruction, wherein the first instruction is to extend access permissions for a page in a secure enclave and the second instruction is to be called, by an application from within the secure enclave, an operating system outside the secure enclave to invoke the second instruction to restrict access permissions for the page;
   execution hardware to execute the first instruction and the second instruction, wherein execution of the first instruction and the second instruction includes changing at least one of a read, write, and execute access permission in an enclave page cache map entry without setting a modified bit in the enclave page cache map entry, wherein execution of the second instruction includes storing an enclave epoch value in the enclave page cache map entry, and wherein the page is immediately accessible from inside the secure enclave according to the changed access permissions; and
   a translation lookaside buffer, wherein the operating system is to track enclave threads with translation lookaside buffer entries made stale by the changed access permissions and send interprocessor interrupts to trigger enclave thread exits and a translation lookaside buffer shootdown.

2. The processor of claim 1, wherein the first instruction is executable from within the secure enclave.

3. The processor of claim 2, wherein the first instruction is executable only from within the secure enclave.

4. The processor of claim 1, wherein the second instruction is executable only in supervisor mode.

5. A method comprising:
   issuing a first instruction to a hardware processor to extend access permission for a page in a secure enclave; and
   executing, by the hardware processor, the first instruction, wherein execution of the first instruction includes changing at least one of a read, write, and execute access permission in an enclave page cache map entry without setting a modified bit in the enclave page cache map entry, and wherein the page is immediately accessible from inside the secure enclave according to the changed access permissions;
   calling, by an application from within the secure enclave, an operating system outside the secure enclave to invoke a second instruction to restrict at least one access permission for the page;
   issuing the second instruction to the hardware processor to restrict the at least one access permission for the page;
   executing, by the hardware processor, the second instruction, wherein execution of the second instruction includes changing at least one of the read, write, and execute access permission in the enclave page cache map entry, and storing an enclave epoch value in the enclave page cache map entry, and wherein the page is immediately accessible from inside the secure enclave according to the changed access permissions;

tracking, by the operating system, enclave threads with translation lookaside buffer entries made stale by the changed access permissions; and sending, by the operating system, interprocessor interrupts to trigger enclave thread exits and a translation lookaside buffer shootdown.

6. The method of claim 5, further comprising:

accessing, by an application from within the secure enclave, the page according to the changed access permissions, and updating, by an operating system from outside the secure enclave, page tables to reflect the changed access permissions.

7. The method of claim 5, further comprising:

attempting, by an application from within the secure enclave, to access the page after execution of the first instruction;

determining, by the hardware processor, that a mapping for the page exists in a translation lookaside buffer; and causing, by the hardware processor, a page fault and an asynchronous exit from the secure enclave.

8. The method of claim 7, further comprising:

handling, by an operating system from outside the secure enclave, the page fault; and restarting, by the operating system, the application in the secure enclave.

9. The method of claim 5, further comprising verifying, by the application from within the secure enclave, that the changed access permissions have been set.

10. A system comprising:

a memory; and a processor including instruction hardware to receive a first instruction and a second instruction, wherein the first instruction is to extend access permissions for a page loaded from the memory into a secure enclave and the second instruction is to be called, by an application from within the secure enclave, an operating system outside the secure enclave to invoke the second instruction to restrict access permissions for the page;

execution hardware to execute the first instruction and the second instruction, wherein execution of the first instruction and the second instruction includes changing at least one of a read, write, and execute access permission in an enclave page cache map entry without setting a modified bit in the enclave page map entry, wherein execution of the second instruction includes storing an enclave epoch value in the enclave page cache map entry, and wherein the page is immediately accessible from inside the secure enclave according to the changed access permissions; and a translation lookaside buffer, wherein the operating system is to track enclave threads with translation lookaside buffer entries made stale by the changed access permissions and send interprocessor interrupts to trigger enclave thread exits and a translation lookaside buffer shootdown.

* * * * *